US011167986B2

(12) United States Patent
Smith et al.

(10) Patent No.: US 11,167,986 B2
(45) Date of Patent: Nov. 9, 2021

(54) BORON NITRIDE NANOTUBE SYNTHESIS VIA DIRECT INDUCTION

(71) Applicant: BNNT, LLC, Newport News, VA (US)

(72) Inventors: Michael W. Smith, Newport News, VA (US); Kevin C. Jordan, Newport News, VA (US); Jonathan C. Stevens, Newport News, VA (US); R. Roy Whitney, Newport News, VA (US)

(73) Assignee: BNNT, LLC, Newport News, VA (US)

( * ) Notice: Subject to any disclaimer, the term of this patent is extended or adjusted under 35 U.S.C. 154(b) by 0 days.

(21) Appl. No.: 17/137,040

(22) Filed: Dec. 29, 2020

(65) Prior Publication Data

US 2021/0139329 A1 May 13, 2021

Related U.S. Application Data

(63) Continuation of application No. 16/561,091, filed on Sep. 5, 2019, now Pat. No. 10,906,810, which is a
(Continued)

(51) Int. Cl.
*C01B 21/064* (2006.01)
*B01J 10/00* (2006.01)
(Continued)

(52) U.S. Cl.
CPC ......... *C01B 21/0641* (2013.01); *B01J 10/005* (2013.01); *B01J 19/0013* (2013.01);
(Continued)

(58) Field of Classification Search
CPC ......... H04W 4/00; H04W 4/02; H04W 4/021; H04W 48/00; H04W 48/16; H04W 72/00;
(Continued)

(56) References Cited

U.S. PATENT DOCUMENTS 3,216,942 A 11/1965 Wentorf
3,352,637 A 11/1967 Heymer
(Continued)

FOREIGN PATENT DOCUMENTS

CA 2689629 A1 2/2009
JP 2005008495 1/2005
(Continued)

OTHER PUBLICATIONS

Apr. 14, 2017 International Search Report issued in International Application No. PCT/US2017/016250.
(Continued)

*Primary Examiner* — Natasha E Young
(74) *Attorney, Agent, or Firm* — Joshua B. Brady; Nixon & Vanderhye, P.C.

(57) ABSTRACT

High quality, catalyst-free boron nitride nanotubes (BNNTs) that are long, flexible, have few wall molecules and few defects in the crystalline structure, can be efficiently produced by a process driven primarily by Direct Induction. Secondary Direct Induction coils, Direct Current heaters, lasers, and electric arcs can provide additional heating to tailor the processes and enhance the quality of the BNNTs while reducing impurities. Heating the initial boron feed stock to temperatures causing it to act as an electrical conductor can be achieved by including refractory metals in the initial boron feed stock, and providing additional heat via lasers or electric arcs. Direct Induction processes may be energy efficient and sustainable for indefinite period of time. Careful heat and gas flow profile management may be used to enhance production of high quality BNNT at significant production rates.

20 Claims, 9 Drawing Sheets

Related U.S. Application Data continuation of application No. 15/576,050, filed as application No. PCT/US2016/023432 on Mar. 21, 2016, now Pat. No. 10,442,691.

(60) Provisional application No. 62/194,972, filed on Jul. 21, 2015, provisional application No. 62/164,997, filed on May 21, 2015.

(51) Int. Cl.

| | | |
|---|---|---|
| B01J 19/00 | (2006.01) | |
| B01J 19/24 | (2006.01) | |
| C04B 35/622 | (2006.01) | |
| B82Y 30/00 | (2011.01) | |
| H04W 4/021 | (2018.01) | |
| H04W 48/04 | (2009.01) | |
| H04W 72/04 | (2009.01) | |

(52) U.S. Cl.
CPC . *C04B 35/6229* (2013.01); *B01J 2219/00132* (2013.01); *B82Y 30/00* (2013.01); *C01P 2004/01* (2013.01); *C01P 2004/04* (2013.01); *C01P 2004/13* (2013.01); *C04B 2235/386* (2013.01); *C04B 2235/404* (2013.01); *C04B 2235/421* (2013.01)

(58) Field of Classification Search
CPC ............. H04W 72/04; H04W 72/0406; H04W 72/042; H04W 72/044; H04W 72/0446; B01J 10/00; B01J 10/005; B01J 19/00; B01J 19/0006; B01J 19/0013; B01J 19/24; B01J 2219/00; B01J 2219/00048; B01J 2219/00051; B01J 2219/0132; B01J 2219/24; C01P 2004/00; C01P 2004/01; C01P 2004/04; C01P 2004/13
See application file for complete search history.

(56) References Cited

U.S. PATENT DOCUMENTS

| | | |
|---|---|---|
| 4,913,887 A | 4/1990 | Sato |
| 5,305,612 A | 4/1994 | Higham |
| 5,593,740 A | 1/1997 | Strumban |
| 5,932,294 A | 8/1999 | Colomboet et al. |
| 6,967,011 B1 | 11/2005 | Saboungi |
| 7,335,890 B2 | 2/2008 | Utterback |
| 7,582,880 B2 | 9/2009 | Wallace |
| 7,704,480 B2 | 4/2010 | Jiang et al. |
| 7,927,525 B2 | 4/2011 | Lizotte |
| 7,993,620 B2 | 8/2011 | Lashmore et al. |
| 8,206,674 B2 | 6/2012 | Smith et al. |
| 8,309,242 B2 | 11/2012 | Wei |
| 8,475,760 B2 | 7/2013 | Rajala |
| 8,602,765 B2 | 12/2013 | Jiang et al. |
| 8,673,120 B2 | 3/2014 | Whitney et al. |
| 8,703,023 B2 | 4/2014 | Sainsbury |
| 8,753,578 B1 | 6/2014 | Smith et al. |
| 2002/0113335 A1 | 8/2002 | Lobovsky et al. |
| 2004/0061047 A1 | 4/2004 | Bolozdynya |
| 2005/0116336 A1 | 6/2005 | Chopra |
| 2005/0118090 A1 | 6/2005 | Shaffer |
| 2005/0126766 A1 | 6/2005 | Lee |
| 2005/0155358 A1 | 7/2005 | Ash |
| 2005/0237442 A1 | 10/2005 | Yamazaki |
| 2006/0098389 A1 | 5/2006 | Liu et al. |
| 2006/0173397 A1 | 8/2006 | Tu |
| 2007/0004225 A1 | 1/2007 | Lu |
| 2008/0138577 A1 | 6/2008 | Sheehan |
| 2008/0150165 A1 | 6/2008 | Stumbo |
| 2008/0153959 A1 | 6/2008 | Charati |
| 2008/0187657 A1 | 8/2008 | Altan |
| 2008/0191395 A1 | 8/2008 | Johnson |
| 2008/0296559 A1 | 12/2008 | Kreupl |
| 2009/0117021 A1 | 5/2009 | Smith et al. |
| 2010/0051679 A1 | 3/2010 | Sainsbury et al. |
| 2010/0051879 A1 | 3/2010 | Sainsbury |
| 2010/0108276 A1 | 5/2010 | Kuwahara |
| 2010/0192535 A1 | 8/2010 | Smith et al. |
| 2011/0104534 A1 | 5/2011 | Wei |
| 2011/0140318 A1 | 6/2011 | Reeves et al. |
| 2011/0143915 A1 | 6/2011 | Yin |
| 2011/0192016 A1 | 8/2011 | Kang et al. |
| 2011/0212308 A1 | 9/2011 | Brown |
| 2012/0045688 A1 | 2/2012 | Liu |
| 2012/0085970 A1 | 4/2012 | Zhang |
| 2012/0168299 A1 | 7/2012 | Whitney et al. |
| 2012/0199747 A1 | 8/2012 | Letant |
| 2012/0321785 A1 | 12/2012 | Rogers et al. |
| 2013/0029242 A1 | 1/2013 | Mizuhata |
| 2013/0064750 A1 | 3/2013 | Zettl |
| 2013/0099264 A1 | 4/2013 | Zimmerman |
| 2013/0144576 A1 | 6/2013 | Gnoffo et al. |
| 2013/0255906 A1 | 10/2013 | Chang et al. |
| 2014/0042330 A1 | 2/2014 | Gozani |
| 2014/0217693 A1 | 8/2014 | Schmidt |
| 2014/0364529 A1 | 12/2014 | Park et al. |
| 2015/0033937 A1 | 2/2015 | Lashmore |
| 2015/0125374 A1 | 5/2015 | Smith |
| 2016/0083253 A1 | 3/2016 | Kim |
| 2016/0144401 A1 | 5/2016 | Carter et al. |

FOREIGN PATENT DOCUMENTS

| | | |
|---|---|---|
| JP | 2006240942 | 9/2006 |
| KR | 2011/0113201 | 10/2011 |
| WO | 2008/113892 | 9/2008 |
| WO | 2009/017526 | 2/2009 |
| WO | 2012/096775 | 7/2012 |
| WO | 2013/021797 | 7/2012 |
| WO | 2012/108941 | 8/2012 |
| WO | 2013/082117 | 6/2013 |
| WO | 2014/169382 | 10/2014 |
| WO | 2014/197675 | 12/2014 |
| WO | WO 2015/066428 | 5/2015 |
| WO | 2015/164777 | 10/2015 |
| WO | 2016/100715 | 6/2016 |

OTHER PUBLICATIONS

Cohen et al., "The physics of boron nitride nanotubes," Physics Today, vol. 63, No. 11, Nov. 1, 2010, pp. 34-38.

Dec. 10, 2018, Extended European Search Report issued in European Application No. 16796866.8.

Feb. 9, 2017 Notice of Preliminary Report issued in Korean Application No. 10-2016-7031895.

Hong et al., Strong viscous behavior discovered in nanotube mats, as observed in boron nitride nanotube mats, Composites Part B, vol. 91, Feb. 8, 2016, retried Mar. 13, 2018, Retrieved from the Internet: <URL: https://pdfs.semanticscholar.org/ba63/afeeecba9dc121b4c71625f5a0942244d862.pdf, pp. 56-64.

Islam et al., Characterization of Carbon Fiber Reinforced Epoxy Composites Modified with Nanoclay and Carbon Nanotubes, Procedia Engineering, vol. 105, 2015, retrieved Mar. 14, 2018, retrieved from the Internet: <URL:https://ac.els-cdn.com/S1877705815008759/1-s2.0-S1877705815008759-main.pdf?_tid=9b94e13b-400c-46a3-b3af-1bdfbc3000af&acdnat=1521215859_72ca270e12acadfde8d5b0c07cf0ac1c., pp. 821-828.

Jan. 5, 2018 Office Action issued in Canadian Application No. 2945977.

Jan. 29, 2018 International Preliminary Examination Report issued in International Application No. PCT/US2017/016250.

Jul. 26, 2018 Supplemental Search Report issued in European Application No. 15 87 1103.

Jun. 7, 2017 Communication pursuant to Article 94(3) EPC issued in European Application No. 15 783 501.8.

Jun. 9, 2017 International Preliminary Report on Patentability issued in International Application No. PCT/US2016/032385.

(56) References Cited

OTHER PUBLICATIONS

Mar. 28, 2018 International Search Report issued in International Application No. PCT/US2018/017231.
Mar. 28, 2018 Written Opinion issued in International Application No. PCT/US2018/017231.
Mar. 24, 2018 Supplementary European Search Report issued in European Application No. 15854542.6.
Nov. 7, 2017 Communication pursuant to Article 94(3) EPC issued in European Application No. 15 783 501.8.
Nov. 19, 2018 Office Action issued in Canadian Application No. 2945977.
Nov. 29, 2018 Extended European Search Report issued in European Application No. 16793614.5.
Oct. 22, 2018 Supplementary European Search Report issued in European Application No. 15871103.6.
Peters et al., "A New Fullerene synthesis," Angew. Chem. Int. Ed., vol. 31, No. 2, 1992, VCH Verlagsgesellschaft mbH, W-6940 Weinheim, pp. 223-224.
Smith et al., Very Long Single and Few-walled Boron Nitride Nanotubes via the Pressurized Vapor/Condenser Method Nanotechnology, 2009.
Wang et al., Recent Advancements in Boron Nitride Nanotubes, Nanoscale, 2010, 2, 2028-2034.
K.S. Kim, C.T. Kingston, A. Hrdina, M.B. Jakubinek, J. Guan, M. Plunkett and B. Simcard, ACS Nano, 2014, 8, 6211.
A. Fathalizadeh, T. Pham, W. Michelson and A. Zettl, Nano Lett., 2014, 4881.
Nishiwaki et al., Atomic structures and formation mechanism of boron nitride nanotubes and nanohorns synthesized by arc-melting $LaB_6$ powders; J. of the European Ceramic Society 26 (2006) 435-441.
Su et al., Selective Growth of Boron Nitride nanotubes by Plasma-Assisted and Iron-Catalytic CVD Methods, J. Phys. Chem., Jul. 22, 2009, 113, pp. 14681-14688. (cited in Feb. 15, 2015 Written Opinion for PCT/US2014/63349).
Mukhanov, et al., On Electrical Conductivity of Melts of Boron and Its Compounds Under Pressure, Journal of Superhard Materials, vol. 37, No. 4, 2015, pp. 289-291.
Hanafin, et al., Boron Fiber Neutron Shielding Properties, Specialty Materials, 2011 (Retrieved on Jul. 14, 2016) from Internet URL http://www.specmaterials.com/pdfs/boronneutronshielding.pdf p. 1.
Yu, et al., Dispersion of boron nitride nanotubes in aqueous solution with the help of ionic surfactants, Solid State Communications 149 (2009) 763-766. (Retrieved Jul. 14, 2016 from internet URL http://dro.deakin.edu.au.view.DU_30029180 pp. 763-766.
Yanagishita, H. et al., "Preparation of polyimide composite membrane by chemical-vapor-deposition and polymerization technique (CVDP)," Journal of Applied Polymer Science, 1993, vol. 49, Issue 4, pp. 565-572; retrieved from the internet: <DOI: 10.1002/app.1993070490402>; entire document, especially p. 566-567; Figs. 2-3.
Hutchins, C.W. et al., "Apparatus for chemical vapor deposition of polyimide films," Review of Scientific Instruments, 1995, vol. 66, issue 7, pp. 3943-3947; retrieved from the internet: <DOI: 10.1063/1.1145399> entire document, especially p. 3943-3944, Figs. 1-2.
Putkonen, M. et al., "Atomic layer deposition of polyimide thin films," Journal of Materials Chemistry, 2006, vol. 17, issue 7, pp. 664-669; retrieved from the internet: <DOI: 10.1039/B612823H> entire document, especially p. 665-667, Schemes 1-2, Fig. 2.
Gnoffo et al., "Modeling of Laser Vaporization and Plume Chemistry in a Boron Nitride Nanotube Production Rig," NASA Technical Reports Server (NTRS) 20120011733, 23 pages, Jun. 25, 2012 (Jun. 25, 2012), accessed online at https://archive.org/details/NASA_NTRS_Archive_20120011733.
Demirel, M.C. et al., "Spatially Organized Free-Standing Poly (p-xylylene) NanowiresFabricated by Vapor Deposition," Langmuir, 2017, vol. 23, issue 11, pp. 5861-5863; retrieved from the internet: <DOI:10.1021/1a7005381> entire document, especially p. 5861-5862, Fig. 1.
Goldberg, D. et al., "Boron Nitride Nanotubes and Nanosheets," ACS Nano, 2010, vol. 4, issue 9, pp. 2979-2993; retrieved from the internet <DOI: 10.1021/nn1006495> see entire document, especially p. 2987-2988, Fig. 14.
Tiano et al., "Boron Nitride nanotube: Synthesis and Applications," Proc. of SPIE vol. 9060, 2014.
International Search Report and Written Opinion for PCT/2014/063349, USPTO, dated Feb. 15, 2015.
International Search Report and Written Opinion for PCT/US2015/027570, USPTO, dated Aug. 7, 2015.
International Search Report and Written Opinion for PCT/US2015/058615, USPTO, dated Jan. 19, 2016.
International Search Report and Written Opinion for PCT/US2016/023432 dated May 26, 2016.
International Search Report and Written Opinion for PCT/US2015/066464 dated Apr. 11, 2016.
International Search Report and Written Opinion for PCT/US2016/032385 dated Aug. 26, 2016.
Korean Preliminary Office Actgion dated Mar. 7, 2017 in KR Application No. 10-2016-7031895 with English language translation of the same.
Extended European Search Report dated Feb. 2, 2017 in EP Application No. 15783501.8.
Canadian Office Action dated Nov. 17, 2016 in CA Application No. 2945977.
Australian Examiner's First Patent Examination Report dated Oct. 25, 2016 in Australian Patent Application No. 2015249316.
Canadian Office Action dated Jun. 9, 2017 in CA Application No. 2945977.
Canadian Office Action dated Jan. 6, 2018 in CA Application No. 2945977.
Communication Pursuant to Article 94(3) in EPC dated Nov. 11, 2017 in EP Appln. No. 15783501.8.
Non-Final Office Action dated Dec. 11, 2017 (with Supplemental Action dated Dec. 12, 2017) in U.S. Appl. No. 15/305,994.
Non-Final Office Action dated Dec. 21, 2017 in U.S. Appl. No. 15/540,539.
International Search report and Written Opinion for PCT/US2017/043140 dated Oct. 13, 2017.
Non-Final Office Action dated Oct. 20, 2017 in U.S. Appl. No. 15/689,500.
Kingston, "Large-scale synthesis of few-walled small diameter boron nitride nanotubes (sub-10 nm) by an induction thermal plasma" NT13, Espoo Finland, Jun. 28, 2013.
Japanese Notification of Reasons for Refusal dated Nov. 21, 2017 in JP 2017507928.
Japanese Notification of Reasons for Refusal dated Mar. 13, 2018 in JP 2017507928.
European Communication dated Jan. 12, 2018 in EP 16796866.8.
Machine translation of JP 2006-240942 A, which was published on Sep. 14, 2006 (Year: 2006).
Machine translation of JP 2005-008495 A, which was published on Jan. 13, 2005 (Year: 2005).
Kim et al., Synthesis of Single-Walled Carbon Nanotubes by Induction Thermal Plasma, 2009, Nano Research, 2, 800-817, (Year: 2009).
J-L. Cochon, et al. "A Continuous Wave CO2 Laser Reactor for Nanotube Synthesis", AIP Conference Proceedings 486, Jan. 1, 1999, pp. 237-240.
Maser, W. K. et al., "Production of Carbon Nanotubes: the light approach", Carbon, Elsevier, Oxford, GB, vol. 40, No. 10, Aug. 1, 2002, pp. 1685-1695.
Maser, W. K. et al., "Production of High-Density Single-Walled Nanotube Material by a Simple Laser-Ablation Method", Chemical Physics Letters, vol. 292, No. 4, 2002, pp. 587-593.
Extended European Search report for EP 19184253.3 dated Nov. 22, 2019.

BORON NITRIDE NANOTUBE SYNTHESIS VIA DIRECT INDUCTION

This application is a Continuation of application Ser. No. 16/561,091, filed Sep. 5, 2019, which is a Continuation of application Ser. No. 15/576,050, filed Nov. 21, 2017, now U.S. Pat. No. 10,442,691, issued Oct. 15, 2019, which is a National Stage Entry of International Application No. PCT/US16/23432, now WO/2016/186721 filed Mar. 21, 2016, which claims the benefit of U.S. Provisional Patent Application No. 62/194,972 filed Jul. 21, 2015, which claims the benefit of U.S. Provisional Patent Application No. 62/164,997, filed May 21, 2015, of which are hereby incorporated by reference in their entirety.

STATEMENT REGARDING GOVERNMENT SUPPORT

None.

FIELD

The present disclosure generally relates to synthesizing boron nitride nanotubes (BNNT), and in particular generating boron melts and enhancing the synthesis of boron nitride nanotubes using Direct Induction processes.

BACKGROUND AND SUMMARY

Synthesizing boron nitride nanotubes (BNNTs) that are highly crystalline with few defects, and that are few-wall with aspect ratios generally exceeding 10,000 or even a 1,000,000 to 1, require stable and well-controlled self-assembly regions that are typically at high temperature. Minimizing boron and boron nitride impurities in the BNNT material produced in these synthesis processes is important for many potential uses of such BNNTs. In addition, manufacturing BNNTs in the quantities needed for many applications is an increasingly important consideration.

For the creation of BNNTs in the form of long fibers, yarns, or strings, the purity and alignment of the BNNTs is often dominated by the quality of the BNNT material in the synthesis process, as taught in International Patent Application Ser No. PCT/US2015/27570. Current laser processes, such as described in International Patent Application Ser. No. PCT/US2015/58615, and Inductively Coupled Plasma (ICP) processes, such as described in International Patent Application Ser. No. PCT/US2014/63349, have demonstrated that they can produce BNNTs of desirable quality. However these processes may have limitations due to energy efficiency and limitations due the levels of impurities of boron particles, amorphous boron nitride (amorphous BN) particles and hexagonal boron nitride (h-BN) particles.

Generally, BNNT structures may be formed by thermally exciting a boron feedstock in a chamber in the presence of nitrogen gas. Unlike carbon nanotubes (CNTs), U.S. Pat. No. 8,206,674 to Smith et al., incorporated by reference in its entirety, indicates that BNNTs form without the presence of chemical catalysts, and preferably at elevated pressures of about 2 atm to about 250 atm. CNTs, on the other hand, typically require the presence of chemical catalysts such as metal catalysts. It has been shown that BNNTs do not form in the presence of such catalysts, indicating that the formation of BNNTs is fundamentally different than the formation of CNTs.

Most contemporary BNNT synthesis methods have severe shortcomings, including one or more of having low yield, short tubes, discontinuous production, poor crystallinity (i.e., many defects in molecular structure), and poor alignment. Additionally, many contemporary BNNT synthesis methods do not produce high quality BNNTs. Although there is no agreed upon standard in the scientific literature, the term 'high quality' BNNTs generally refers to long, flexible, molecules with few defects in the crystalline structure of the molecule. Apart from the Applicant's processes, there are no other reports of the synthesis of continuous BNNT fibers or BNNT strands, particularly having few defects and good alignment. The BNNT "streamers" described in U.S. Pat. No. 8,206,674 to Smith et al., for example, form near a nucleation site such as the surface of the boron feedstock, but were limited to about 1 cm in length. BNNT "streamers" at such lengths are inadequate for producing BNNT fibers and yarns.

What is needed are apparatus, systems, and methods, for the continuous production of BNNT fibers and BNNT strands, having few defects and good alignment. The Applicant has described such apparatus, systems, and methods in related applications. For example, in International Patent Application No. PCT/US15/27570 (incorporated by reference in its entirety), Applicant describes, inter alia, the continuous formation of BNNT fibers, BNNT strands, and BNNT yarns. In that disclosure, Applicant provides embodiments in which one or more lasers provide thermal excitement for generating a boron melt.

While driving the synthesis of high quality BNNT via laser driven embodiments is effective, as described in International Patent Application Ser. No. PCT/US2015/58615, the laser driven processes are relatively inefficient from the conversion of electrical energy, or other forms of energy, into the final high quality BNNT, and consequently can be difficult to scale to very high powers. For example, known laser driven BNNT synthesis systems are less than 5 kW average power.

For decades radio frequency (RF) Induction technology has been utilized to melt materials at power levels ranging from watts to megawatts. Items ranging in size from less than a finger ring to large vats of material have melted. However, RF technology has not been used for synthesizing BNNTs at high temperatures, i.e. above the melting point of boron, and in particular has not been implemented for synthesizing high quality BNNTs. When RF Induction is utilized for heating a boron melt to synthesize high quality BNNTs, RF Induction will be referred to as Direct Induction.

RF Induction heating is commonly used to heat solids for the purposes of surface modification. This can result in solid-state reactions within the solid (for example, the heat treatment process of austenitization, which may occur only at the surface or at any depth within the material) or processes in which the surface reacts with an atmosphere (carburizing, nitriding, boriding, etc.) RF Inductive heating applications such as forging or welding are not relevant here. RF Induction heating is also used extensively to melt metals for refining, alloying, and casting operations. While RF Induction heating has recently been used to process nonconductive nonmetals that become conductive at high temperatures (for example, silicon crystal growth, crystal refinement, or skull melting of cubic zirconia, etc.), in these applications all of the chemical reactions take place within the melt.

Additionally, Direct Induction has not been utilized for the synthesis or carbon nanotube (CNT) self assembly process. It should be noted that the processes and systems described herein do not apply to the formation of carbon nanotubes (CNTs). High temperature BNNT synthesis processes and systems generally involve forming a liquid material, referred to herein as a boron melt, from a boron feedstock, in more or less steady state and at very high temperature, in a nitrogen environment at an elevated pressure, such that the process produces combination of the liquid material and the gas, without involving catalysts or other elemental chemically reactive species. On the other hand, CNTs synthesis usually requires metal catalyst or other elements such as hydrogen that do not end up in the CNTs except as impurities. Certain arc discharge and laser processes will make limited quantities of CNTs, usually in vacuum, low pressure environments of hydrocarbon gases or inert gases. As a final example of the differences between the synthesis of BNNT and CNT, a CNT synthesis processes involve having a steady state ball of liquid carbon without catalysts would minimally require a temperature of 4,300° C. just to achieve the liquid carbon state and a temperature higher than this to achieve any level of CNT self assembly in a region of pure carbon gas that would have to be at a nearly equally high temperature.

Accordingly, what is needed are energy-efficient apparatus, systems, and methods, for synthesizing BNNTs, including high quality BNNTs Further, such apparatus, systems, and methods, should be capable of synthesizing BNNTs at sufficient manufacturing quantities to enable numerous applications of BNNTs. Additionally, such apparatus, systems, and methods, should be capable of producing BNNT fibers, strings, and yarns, including highly aligned BNNT fibers, strings, and yarns.

SUMMARY

Described herein are apparatus, systems, and methods, for synthesizing BNNTs, including high quality BNNTs, incorporating Direct Induction processes.

There are a number of challenges to incorporating Direct Induction processes to synthesizing BNNTs. These challenges to using Direct Induction include: 1) the material being melted must be an electrical conductor, or alternatively be in an electrically conductive container; 2) boron and boron nitride feedstock materials are not electrically conductive at temperatures below 800° C., and are only minimally electrically conductive until they are in a molten state; and 3) high quality BNNT synthesis processes generally operate at temperatures above the melting temperature of boron nitride, 2,973° C.

Applicant has found solutions to these challenges for synthesizing BNNT using Direct Induction. By utilizing Direct Induction as a source of providing heat for the materials going into the BNNT self-assembly process, the indicated issues can be successfully addressed and desired quality and quantities of BNNT can be economically produced. The Direct Induction processes described herein are significantly more energy-efficient than ICP processes, and result in substantially fewer impurities. Unlike ICP processes, in which the plasma heats the gas phase, these Direct Induction processes supply heat to the boron feedstock. As a result, the processing challenges for the Direct Induction processes described herein are unique.

Indeed, until this disclosure, RF Induction has not been used to drive high temperature gas-phase chemical reactions external to the molten material as the primary end product of the process. The use of RF Induction heating in a chemical vapor deposition process is in many ways the opposite, as the reactions take place at the heated surface for the sole purpose of surface modification. In chemical vapor deposition (CVD) processes the RF Induction can be utilized to heat the materials including their surfaces where the vapor is being deposited and or reacted through a variety of chemical reactions. For example, in the production of low quality BNNTs, i.e. typically 10 to 50 walls with many defects, BOCVD (boron oxide chemical vapor deposition) in several versions requires a metal oxide such as MgO or $Li_2O$ in the precursor to act as a catalyst. RF Induction is used to heat a graphite susceptor that surrounds the reaction chamber to a temperature in the region of 1300° C.—well below boron nitride's melting point. As a result, CVD processes do not generate, involve, or result in anything similar to a boron melt, and thus would not be instructive in overcoming the challenges presented by Direct Induction processes.

Under the present approach, a process for synthesizing boron nitride nanotubes generally includes feeding nitrogen gas to a chamber in a first direction, and in some embodiments at an elevated pressure, and supplying power to a Direct Induction coil surrounding a boron feedstock to form a boron melt. The nitrogen gas flow may be controlled at various locations in the process, such as, for example, at the boron melt and through the growth zone. In some embodiments, at least one noble gas may be fed to the chamber, particularly during process start-up. Introducing a noble gas inhibits the formation of boron and boron nitride micro-droplets, which may be beneficial, until the full temperature of the boron melt is achieved. For example, inhibiting the formation during startup minimizes impurities. After the boron feedstock reaches the desired temperature, the noble gas feed to the chamber may be stopped, allowing the BNNT self assembly process to begin. Boron and boron nitride micro-droplets emerge from the boron melt downstream of the boron melt in the first direction, and BNNTs self-assemble downstream from the boron and boron nitride micro-droplets. In some embodiments, supplying power to the Direct Induction coil also causes a portion of the nitrogen gas entering the chamber to dissolve in the boron melt and form boron nitride molecules and subsequently boron and boron nitride micro-droplets.

The boron feedstock includes a material containing boron, and in some embodiments may also include a refractory metal. The refractory material may, for example, be molybdenum and/or tungsten. In some embodiments, the boron feedstock is supported in a crucible. The crucible, in turn, may be supported in by a Direct Induction coil, such as the Direct Induction coil surrounding the boron feedstock, and in some embodiments may be supported by a Direct Induction eddy current field concentrator. The crucible may be cooled in some embodiments, such as through convective cooling, water cooling, air cooling, contact cooling with the crucible, among other techniques known in the art.

In some embodiments, a layer of boron nitride may be deposited under the boron feedstock. In some embodiments, the boron feedstock may be heated to form an electrically conductive boron feedstock. For example, supplemental heating, such as with a laser and/or an electric arc, may be used to raise the temperature of the boron feedstock such that the boron feedstock becomes electrically conductive.

In embodiments of the present approach, an apparatus for synthesizing BNNTs may include a chamber providing a boron feedstock mounting surface, a nitrogen gas supply system configured to feed nitrogen gas, in some embodiments at an elevated pressure, to the chamber in a first direction, a boron feedstock support, and a Direct Induction coil surrounding the boron feedstock support.

Embodiments may include a growth zone region downstream of the boron feedstock support in the first direction, in which BNNTs self-assemble downstream of the boron feedstock support in the first direction. The boron feedstock support may be a crucible, and in some embodiments the crucible may be made of, among other materials, boron nitride.

Some embodiments of the apparatus may also include a Direct Induction eddy current field concentrator. Generally, the concentrator comprises an outer cylindrical portion of a first length in the first direction, and an inner cylindrical portion of a second length in the first direction, the first length being greater than the second length. The concentrator may include a vertical slot configured to force eddy currents generated in the Direct Induction concentrator to follow a circulating path. The concentrator may be configured to house the crucible. In some embodiments, a Direct Induction coil may be configured to house the crucible.

In some embodiments, the apparatus may include a second Direct Induction heating coil surrounding at least a portion of the boron feedstock support. The second Direct Induction coil may also be used to heat a portion of the growth zone, in which BNNTs self-assemble. Some embodiments may include a supplemental heat source, such as at least one laser or electric arc. The supplemental heat source may be used to heat the boron feedstock and boron melt, and cause the boron feedstock to behave electrically conductive. Some embodiments may include a direct current heating coil surrounding at least a portion of the growth zone to control the temperature profile in the growth zone.

DESCRIPTION

The following description is of the best currently contemplated modes of carrying out exemplary embodiments of the present approach for synthesizing boron nitride nanotubes, and in particular generating boron melts and enhancing the synthesis of boron nitride nanotubes using Direct Induction. The description is not to be taken in a limiting sense, and is made merely for the purpose of illustrating the general principles of the present approach.

BNNT synthesis by high temperature processes generally requires heating boron to a liquid boron melt, typically to a temperature near elemental boron's smoking point, i.e. the point at which boron (B) and molecules of boron-nitrogen ($B_xN_y$) are evaporated from the boron melt, the combination referred to as B/BN in this description. The boron feedstock is heated to a boron melt in a nitrogen atmosphere. The operating pressure may be from a tenth of an atmosphere to about 250 atmospheres, including, for example, about 1 atmosphere to about 12 atmospheres. Although capable of synthesizing BNNT at elevated pressures of about 2 atmospheres to about 250 atmospheres, Direct Induction driven processes also synthesize BNNT at lower pressures, including the elevated pressures useful in laser driven and catalyst-free Inductively Coupled Plasma processes. Additionally, noble gases such as helium, neon, argon, krypton and/or xenon may be present for some stages of the Direct Induction processes such as during initial heating of the boron feed stock. The noble gas(es) interfere with the BNNT self-assembly by replacing nitrogen molecules available for reaction, thereby starving the reaction. Increasing noble gas fractional pressure slows the formation of boron and boron nitride micro-droplets and slows the BNNT self-assembly rate, and at high enough fractional pressure will halt the BNNT self assembly and the formation of boron, amorphous BN and h-BN. It should be appreciated that these gases are not serving as catalysts, but instead may be used to control the rate of BNNT formation and the rate of formation of impurities of boron, amorphous BN and h-BN. Minimizing the rate of formation until the boron melt has achieved its operating temperature advantageously reduces impurities in the synthesized BNNTs.

Direct Induction works by setting up a transformer where alternating current (AC) in a primary coil transfers electrical power to induced currents in a secondary conductor. The induced AC currents flowing in the secondary conductor, heat the secondary conductor via resistive heating. More complex Direct Induction involves inserting an intermediary coil, coils, or concentrator, such that there are three or more layers in the resultant transformer.

Generally, processes for generating BNNT through high temperature methods involve three zones in a chamber. This application refers to these heat zones as preheat-support zone, boron melt zone, and BNNT growth zone. The preheat-support zone is configured to allow nitrogen gas to flow into the chamber at an elevated pressure. In some embodiments, the nitrogen gas may be flowing in a flow direction, relative to the melt zone and the growth zone. The boron melt zone is configured to transmit heat to a boron feedstock on a target holder. The heat will form a boron melt from the feedstock, and thus the target holder must be configured to handle the phase transition from the initial feedstock to the boron melt. Boron and boron nitride micro-droplets, including BBN, evaporate from the boron melt, and BNNTs will self-assemble in the growth zone. In embodiments using nitrogen gas flowing in a flow direction, the micro-droplets will both form and evaporate downstream of the boron melt, and the BNNT growth zone will also be downstream of the boron melt. It should be noted that in some embodiments, there may be a gradual transition and/or overlap between zones. Also, any transition and/or overlap between zones may change during operation, such as, for example, from start-up to continuous production. As the Direct Induction power levels and field configurations are adjustable during operation, the power going into the boron melt can be controlled both in terms of total power and power distribution. In turn, the power distribution can be controlled to assist in driving the BNNT self assembly process.

Figure 1:
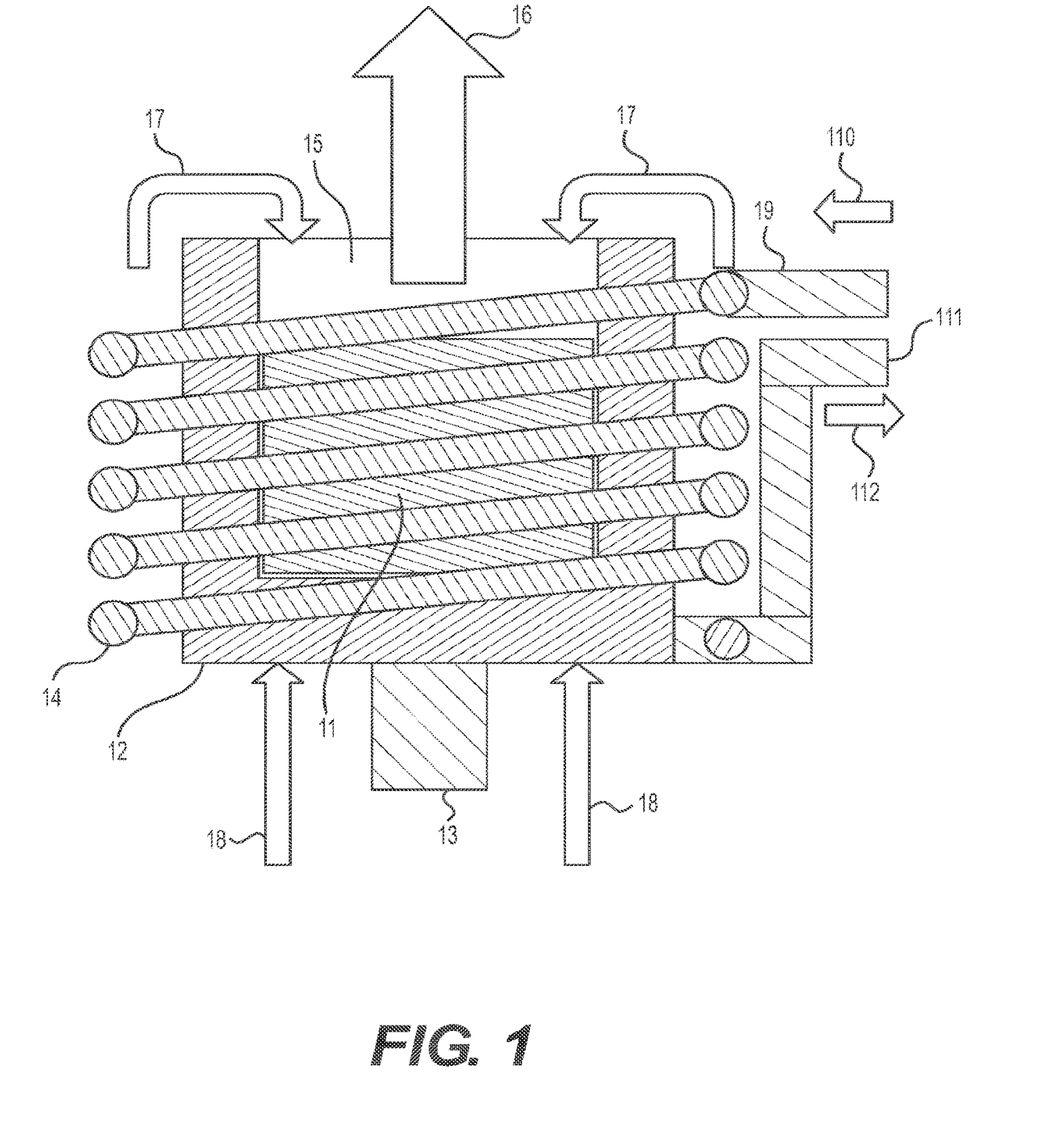
FIG. 1 illustrates an embodiment of an apparatus for synthesizing BNNTs using Direct Induction.

FIG. 1 illustrates an embodiment of an apparatus for synthesizing BNNTs from a boron feedstock using Direct Induction. In this embodiment, the boron melt 11 rests on a crucible 12. The crucible 12 is positioned in a chamber (not shown), and may, in some embodiments, be supported on a post 13. The Direct Induction primary coil 14 surrounds the crucible 12. The number of turns in primary coil 14 in this embodiment is merely demonstrative, as the coil parameters will vary depending on the embodiment. After the boron feedstock has been converted to boron melt 11, the boron melt 11 evolves molecules of B/BN into the region 15 above and around boron melt 11, and into the BNNT self-assembly region 16. Based on the orientation shown in FIG. 1, nitrogen gas enters the process from below crucible 12 as illustrated by arrows 18 through holes (not shown) in the crucible 12. Also, nitrogen gas may enter the process from the crucible 12 above as illustrated by arrows 17. Electrical alternating current power and water cooling flow in and out of the coil 14 from external feeds 19 and 111 as indicated by the arrows 110 and 112. The coil 14 is acting as the primary and the boron melt 11 is acting as the secondary in this embodiment.

Figure 2:
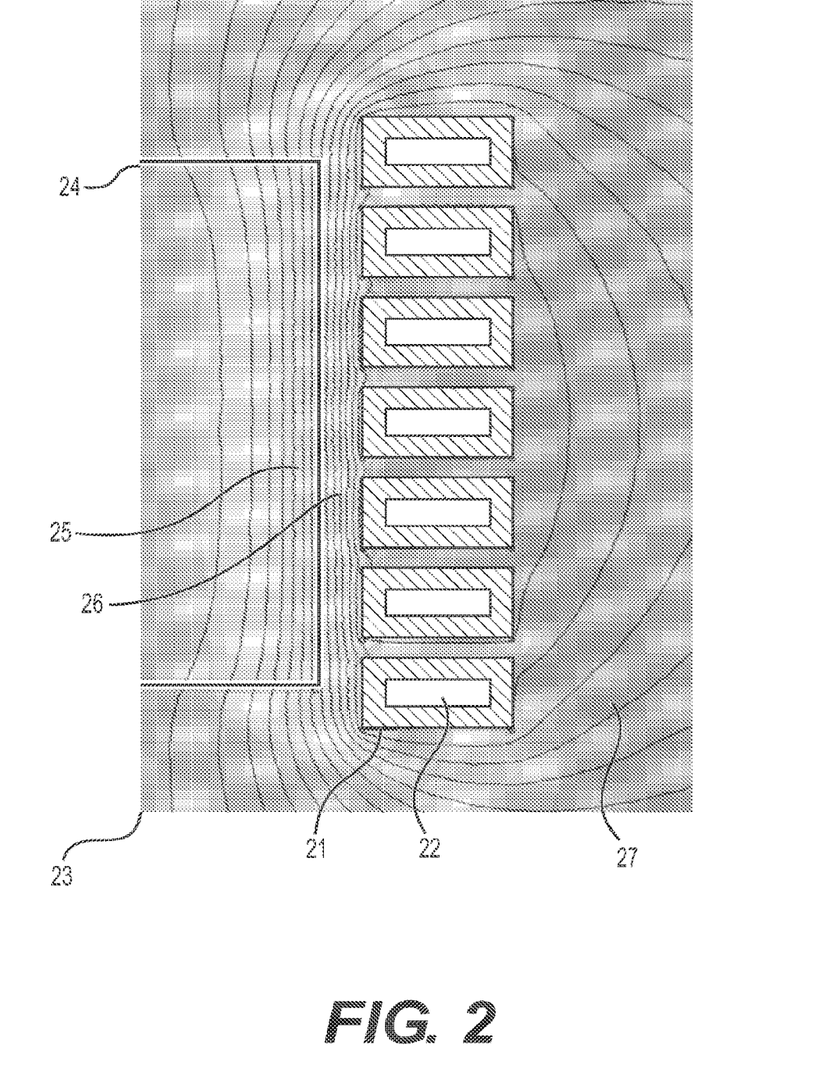
FIG. 2 shows a simulation of the electromagnetic field intensity around a cross-section of a Direct Induction coil.

FIG. 2 shows a simulation of the electromagnetic field intensity around a cross-section of a Direct Induction coil. The electromagnetic field lines of a Direct Induction coil 21 with its water cooling channels 22 are visible to one side of the center line 23 (the remainder of the apparatus is omitted for ease of demonstration). The region near the boron melt 24 shows how the outer edges of the boron melt region 25 experience the nearby field 26 from the Direction Induction coil 21. The feedback of the boron melt 24 on the local fields 25 and 26 has not been included in the simulation. The outside field 27 is substantially less strength. As one of ordinary skill will appreciate, the dimensions of the coil 21 including the geometry of the tubing forming the coil 21, the size of the boron melt region 24, the spacings between the components, and the frequency and power level of the alternating current, contribute to the strength of the electromagnetic fields generated in the boron melt region 24. Thus, these parameters may be adjusted to suit a specific embodiment of the present approach so as to optimize the temperature distribution of the boron melt 11 and the temperature distribution of the BNNT self assembly region 16.

Figure 3A:
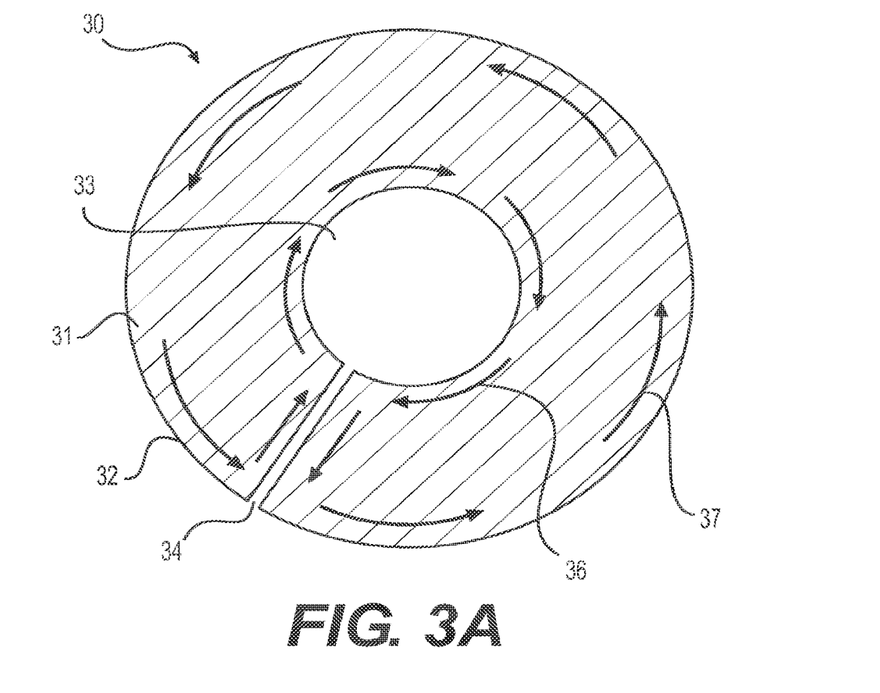
FIGS. 3A and 3B illustrate a concentrator and its electrical current and cooling water flows according to an embodiment of the present approach.
Figure 3B:
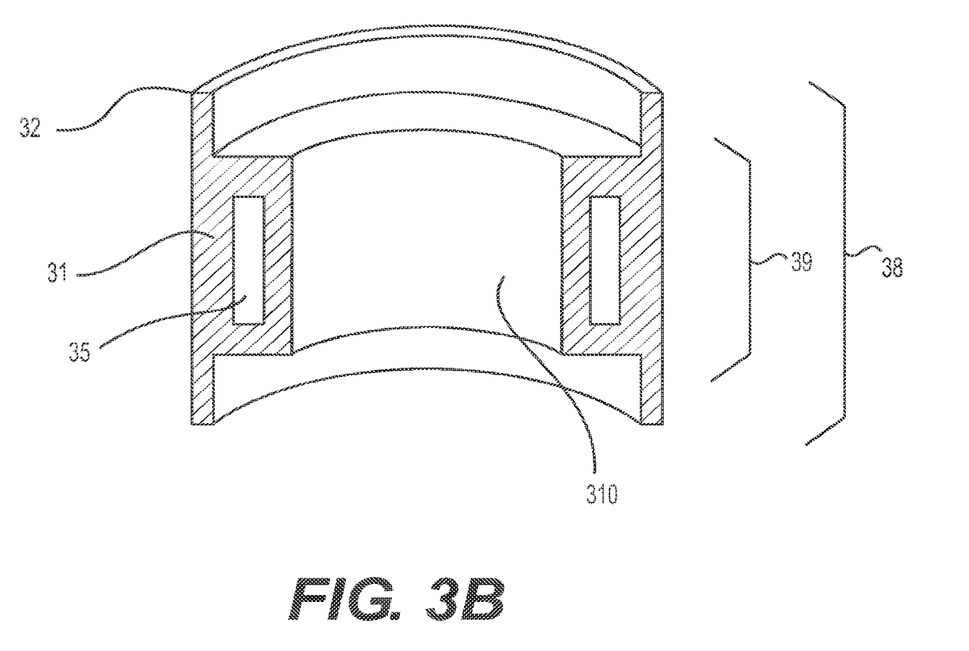

Some embodiments may include a Direct Induction eddy current field concentrator that operates as a secondary coil, thereby effectively adding an additional loop. Some embodiments may find a Direct Induction eddy current field concentrator useful to achieve the desired heat profile in the region of the boron melt. FIGS. 3A and 3B illustrate a concentrator 30 and its electrical current 36 and 37 flows and cooling water channels 35 according to an embodiment of the present approach. The concentrator 30 may be utilized as an element in a Direction Induction transformer. The outer portion 32 of a Direct Induction concentrator 30 in FIGS. 3A and 3B is cylindrical in this embodiment, and concentrator 30 is approximately the height 38 of the Direct Induction primary coil 14 in FIG. 1. The inner portion of the Direct Induction concentrator 31 has an open center 33 for receiving the boron melt 11 and its crucible 12, and the height 39 of the inner portion 31 is less than the height 39 of the outer portion 32 such that the highest level of current is on the inner surface 310 of the concentrator 30. As shown in FIG. 3A, a vertical slot 34 may be placed in the Direct Induction concentrator 30. Slot 34 forces eddy currents generated in the Direct Induction concentrator 30 by the currents in the Direct Induction primary coil 14 (not shown in FIG. 3) to follow a circulating path as by the arrows 36 and 37. The circulating path is a result of the Lorentz forces between the inner 36 and outer 37 eddy currents. The currents generated in the boron melt 11 (not shown in FIG. 3) mostly come from the inner eddy currents 36 in the Direct Induction concentrator 30. As one of ordinary skill in the art should appreciate, the shape of the fields in the region 33 of the boron melt 11 can be controlled by the relative ratio of the height 38 of the outer portion 32 to the height 39 of the inner portion of the Direction concentrator 31, as well as the inner radius profile 310 of the inner portion 31 of the Direct Induction concentrator 30. Typically the Direct Induction concentrator 30 is made of copper, but other highly electrically and thermally conductive materials can be considered.

Figure 4:
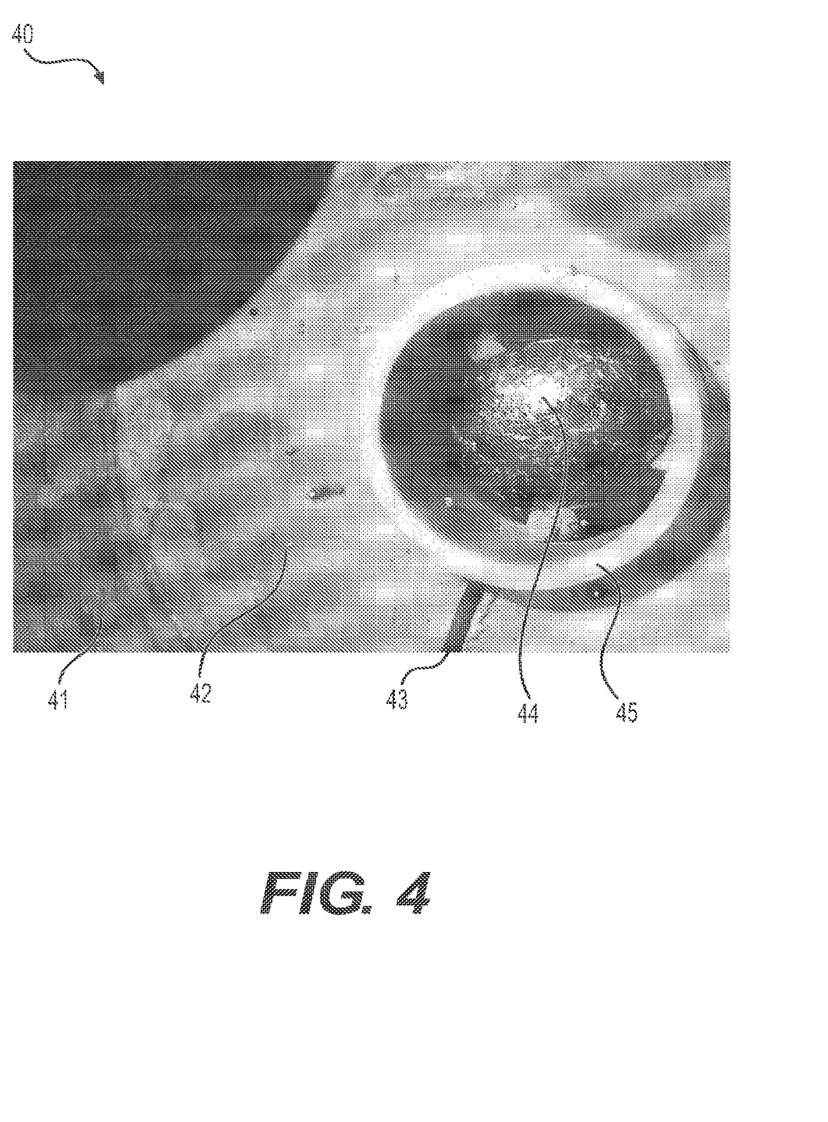
FIG. 4 is a photograph showing a concentrator containing a cooled boron melt generated using an embodiment of the present approach.

FIG. 4 shows a close-up image of a portion of a prototype Direct Induction concentrator 40 in which a boron melt 44 was generated from a boron feedstock using Direct Induction. This image shows the boron melt 44 cooled in the boron nitride crucible 45. The prototype concentrator 40 housed the boron nitride crucible 45 as described above. For clarity, only the outer portion 41 of the concentrator 40, the inner portion 42 of the concentrator 40 and the slot 43 in the concentrator 40 are shown. The remainder of the prototype apparatus is not visible in FIG. 4.

Figure 5:
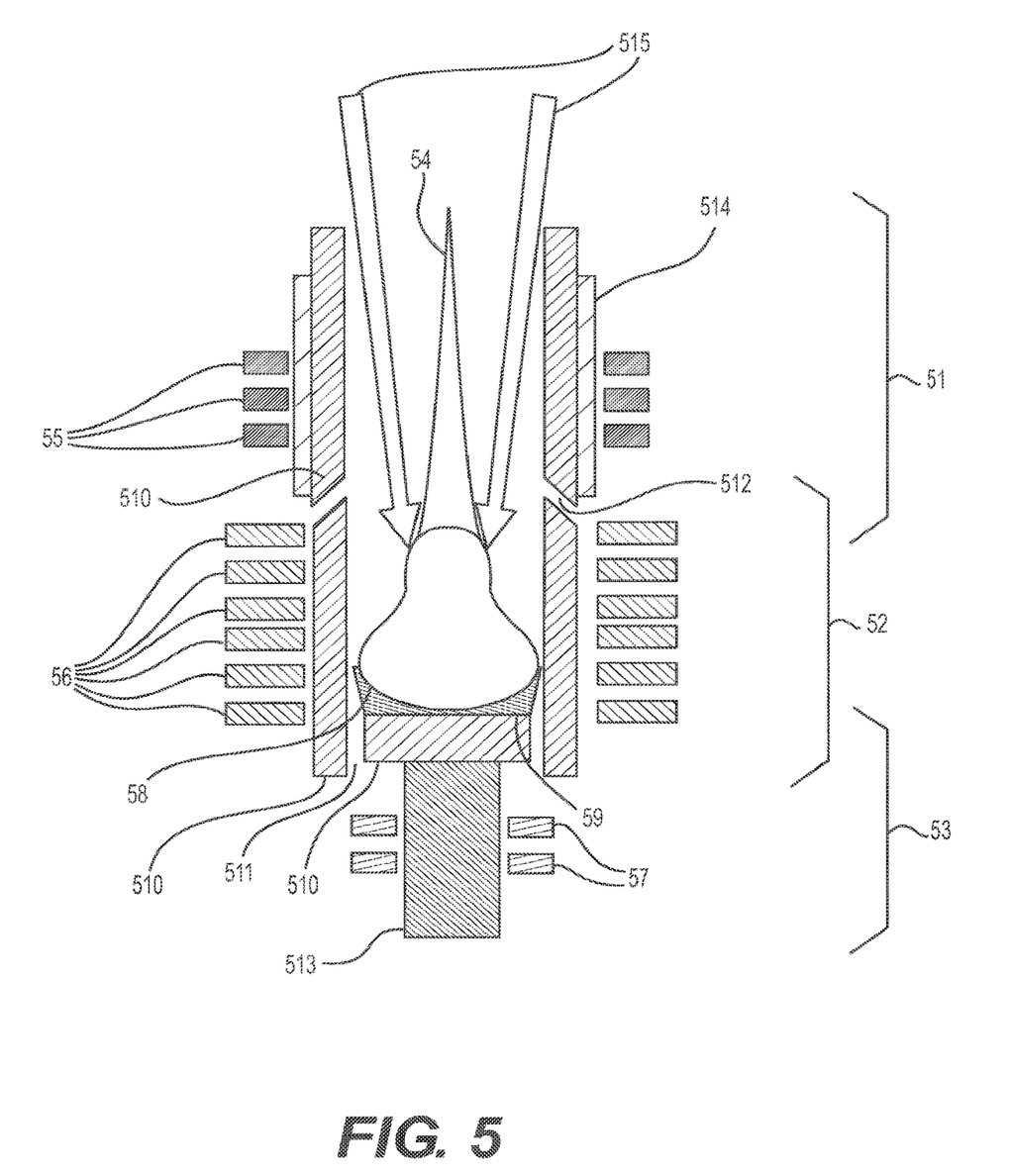
FIG. 5 illustrates an embodiment of an apparatus for synthesizing BNNTs using Direct Induction.

FIG. 5 illustrates an embodiment of an apparatus for synthesizing BNNTs using Direct Induction. The embodiment shown in FIG. 5 may be configured to synthesize high quality BNNT, and may include one or more additional sources of heating to control the synthesis process. There are three overlapping zones illustrated in FIG. 5:

1) The preheat-support zone 53 may include physical support post 513 for the boron feedstock (e.g., at start-up), and also for the generated boron melt 58 (e.g., after initial heating and during generally steady-state operation). In some embodiments, the boron melt 58 may be large enough to require physical or mechanical support in the apparatus, and thus in some embodiments the physical support 513 may support a boron nitride crucible 510 holding the boron melt 58. The preheat zone 53 may in some embodiments include a Direct Induction or direct current heating coil 57 for the support post 513. Alternatively, in some embodiments the support post 513 may require water cooling and the coils shown 57 may be for water rather than electrical currents. The selection of cooling or heating the support post 513 in a particular embodiment depends on the specific embodiment, including, for example, the size and weight of the particular apparatus and the potential benefit of heating or cooling the free, unoccupied space in the pre-heat support zone to optimize the nitrogen flows. Some embodiments may include pre-heating the nitrogen gas flowing into the pre-heat support zone.

2) The boron melt zone 52 is the zone in an apparatus in which heat is introduced to the boron melt 58. As described above, during start-up the heat raises the boron feedstock temperature to generate a boron melt 58, and then during operation maintains the boron melt 58 at its smoking point, i.e., temperature above which the boron melt 58 evolves boron and boron-nitrogen molecules, $B_xN_y$, ("B/BN"). The B/BN molecules flow into the BNNT growth zone 51, in which BNNTs self-assemble from the B/BN molecules and associated B/BN liquid droplets. Self-assembly occurs predominantly downstream of the boron melt 58, although the location of the BNNT growth zone 51 will depend on the particular embodiment and operating conditions. The Direct Induction coil 56 holds the boron nitride crucible 510 and the Direct Induction coil 56 provides cooling to the boron nitride crucible 510 from contact with the boron nitride crucible 510. Boron nitride filler material, not shown, may be introduced between the Direct Induction coil 56 and the boron nitride crucible 510 and between the coils in the Direct Induction coil 56. The boron nitride crucible 510 can be held below the melting temperature of boron nitride of 2,973° C., to reduce degradation of the crucible. The boron nitride crucible 510 may also be cooled by nitrogen gas entering the crucible, such as, for example, from openings below 511, openings on the sides 512 and/or the opening at the top (see FIG. 1, arrows 17). The boron melt 58 is also provided support from a crust 59 of boron and boron nitride material formed between the boron melt 58 and the boron nitride crucible 510 and the support post 513. The crust 59 forms on boron melt 58 during start-up, although in some embodiments it may be advantageous to place the boron feedstock on a thin layer or bed of boron nitride powder on crucible 510, to initiate formation of the crust 59. In some embodiments, a laser, multiple lasers or electrical arcs 515 may be used to provide heat to the boron feedstock and/or boron melt 58 from an opening at the top of the boron nitride crucible 510. There are at least two general reasons to have these supplemental sources of heat: 1) they may be useful in bringing the initial boron feedstock to a sufficiently high temperature above 800 C, where the boron feedstock becomes sufficiently electrically conductive for the electromagnetic fields from Direction Induction coil 56 to further increase the temperature of the boron feedstock to become a boron melt 58; and 2) formation of high quality BNNTs requires control of the temperature profile of the BNNT self assembly region 54 such that the B/BN liquid droplets and associated B/BN molecules fully convert to BNNT rather than converting to boron particles, amorphous BN and/or h-BN. The supplemental sources of heat 515 can be utilized to provide heat to regions of the boron melt 58 such that a temperature profile in the self assembly region 54 has the optimal conditions for BNNT self assembly.

In some embodiments, cooling the crucible 510 may be performed during operation to prevent over-heating and degradation. In the process of providing the cooling to the boron nitride crucible 510, the nitrogen gas entering the crucible (see FIG. 1, arrows 17 and 18) is heated as it feeds into the chamber and proceeds toward the boron melt zone 52. In addition, the nitrogen gas entering the chamber can also provide cooling to the support post 513. The nitrogen gas flows throughout the chamber may thus be configured to assist in cooling structures of the apparatus.

3) In the growth zone 51, B/BN molecules generally form B/BN micro-droplets downstream of the boron melt 58. BNNTs self-assembly from the BBN micro-droplets, also downstream of the boron melt 58. To maximize the self-assembly of BNNTs from the B/BN micro-droplets, the BNNT growth zone 51 temperature profile may be controlled to account for radiative and convective heat loss. For example, the upper portion of the boron nitride crucible 510 can be cooled as required by a combination of the nitrogen gas convectively flowing along external surfaces of the crucible 510, nitrogen gas flowing into the openings 511 and 512 (if included) in the crucible 510, and optionally also water-cooled copper (not shown) surrounding the upper portions of the crucible 510.

In some embodiments it may be desirable to provide additional heat to the BNNT growth zone 51 in addition to the supplemental heat sources 515. A refractory metal or graphite cylinder 514, which may be surrounded by an additional Direct Induction coil 55, can be used to add heat to the BNNT growth zone 51. Alternatively, additional heat can be supplied by other heat sources as are known in the art, such as, for example, alternating or direct current heaters (not shown), lasers, and the like. In some embodiments, there may be sufficient electrical conductivity in the growth zone 51 that Direct Induction or alternatively microwave heating (not shown) also feed heat into the growth zone 51. Providing supplemental heat allows for managing the residence time of the B/BN micro droplets and B/BN molecules in the BNNT self assembly region 54. For example, in some embodiments the laser(s) 515 are utilized to control the heat distribution of the upper portions of the boron melt 56, the upper Direction Induction coil 55 is utilized to control heat going directly into the BNNT self assembly region. Further, as one of ordinary skill in the art will appreciate, the inner radius profiles, the detailed spacing of the coils elements going into the direction induction coils 55 and 56 and the frequency of the Direct Induction power can all be utilized to control the heat flowing into the processes of the boron melt 58 and the BNNT self assembly region 54.

As illustrated in FIG. 5, the support zone 53, melt zone 52 and growth zone 51 may all overlap in some embodiments. The frequencies utilized for the Direct Induction coils 55, 56 and/or 57 if present do not have to be the same. Each coil 55, 56 and/or 57 may have a frequency optimized for the conditions of the specific embodiment. As one of ordinary skill in the art should appreciate, Direct Induction frequencies and RF frequencies are dependent on the sizes and geometries of the components and the levels of power (heating) used in a particular embodiment. The radius of the inner surface of the Direct Induction concentrator if used may be varied with height so as to vary the heating and the Lorentz forces on the boron melt 58 so as to increase or decrease the heating in a given portion of the boron melt 58, and further to increase or decrease the amount of levitation forces on the boron melt 58. In general, the Lorentz forces will be in the direction of pushing in on the boron melt 58 and up on the boron melt 58. If these forces are not managed then the boron melt 58 can become unstable and oscillate in the crucible 510. These forces push inward against the boron melt 58, which may be beneficial as it keeps the boron melt 58 in the crucible 510 from touching the walls of the boron nitride crucible 510, particularly at operating temperatures in excess of boron nitride's melting point. The detailed shape, frequencies, power levels for the Direct Induction coil 56 size of the boron melt 58 should be considered to achieve stable operation. In some embodiments, a reverse turn may be included (not shown) to further inhibit levitation of the upper portions of the boron melt 58. A reverse turn may be included in an additional coil, too. In some embodiments, the levitation forces may be utilized to levitate the boron melt 58 to a position slightly above the bottom of the boron nitride crucible 510. This can be utilized to reduce the cooling coming from the boron nitride crucible 510.

Figure 6:
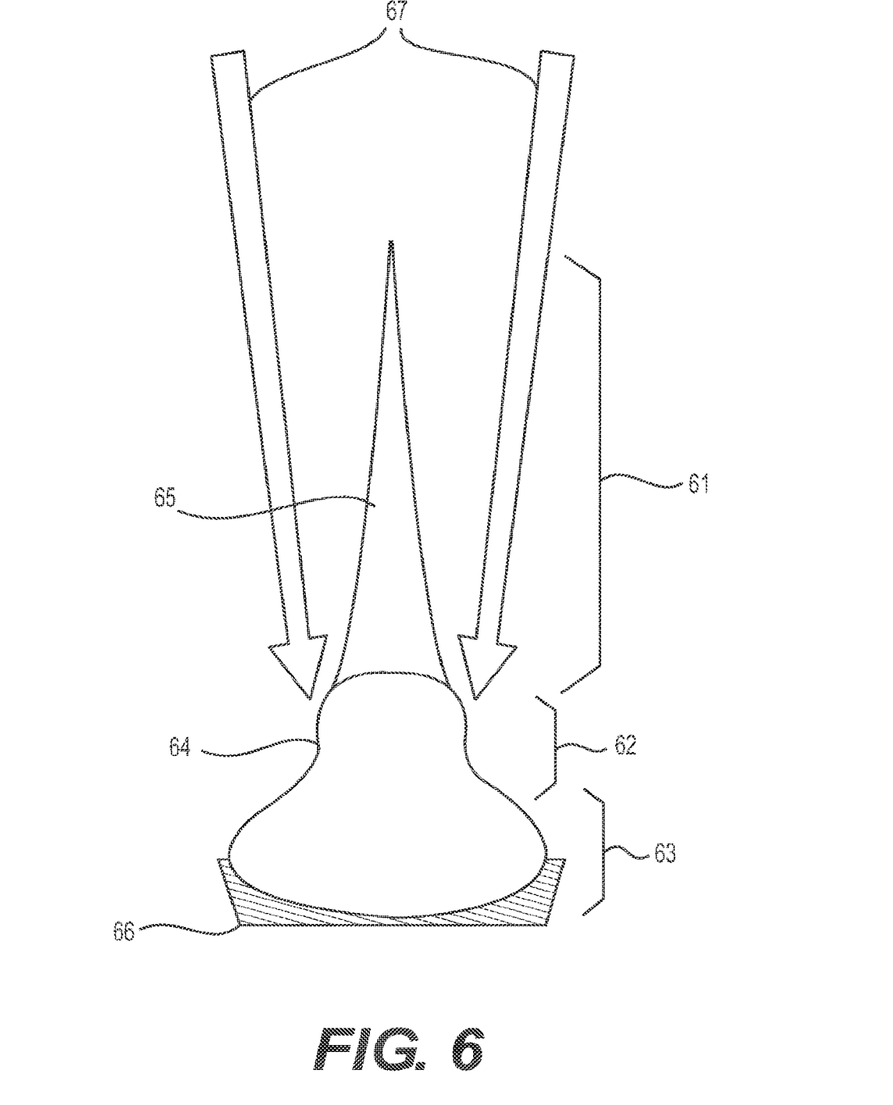
FIG. 6 illustrates an enlarged view of an aspect of an embodiment of an apparatus for synthesizing BNNTs using Direct Induction.

FIG. 6 illustrates an enlarged view of an aspect of an embodiment of an apparatus for synthesizing BNNTs using Direct Induction. Boron melt 64 and BNNT self-assembly in the growth zone 61 (also 53 in FIG. 5) are shown in more detail to demonstrate how to form the boron melt 64 from a feedstock, and control the temperature profile. As discussed above, Direct Induction is not useful unless the boron feedstock is electrically conductive. The boron feedstock may be heated to above 800 C, so that it is adequately electrically conductive, with one or more lasers 67 or electrical arcs. Alternatively, or additionally, the boron feedstock may include one or more refractory metals, such as of molybdenum, tungsten, or other refractory metal in the feedstock. The amount of refractory metal in the initial boron feedstock depends on the mass of the initial boron feedstock, and may vary from a few percent to factors of five or more than the amount of boron as determined by weight. The amount of refractory metal needed is less if some of the refractory metal is relatively pure and not dispersed into the boron feed stock. If one or more refractory metals are used, they do not participate in the BNNT self-assembly as either reactants or catalysts, and only serve to provide a conductor that can be heated by the Direct Induction-induced eddy currents. If one or more lasers 67 is present, the beam may enter the apparatus from an angle such as shown in FIG. 6, so as not to disrupt the self-assembly region 65 and BNNTs flowing downstream. The angle of laser 67 shown in FIG. 6 is merely demonstrative, and in practice the angle will depend on the specific embodiment. Additionally, it may in some embodiments be useful to have helium, neon, argon, krypton, and/or xenon gas mixed with the nitrogen. These gases can be used to inhibit the BNNT self assembly process during start up, thereby reducing impurities in the BNNT material. Once the boron melt 58 and 68 has reached the desired temperature, the amounts of as helium, neon, argon, krypton and/or xenon can be reduced and the BNNT self assembly can proceed.

After the boron feed stock is sufficiently heated to become adequately electrically conductive, the Direct Induction eddy currents in the boron feedstock heat the boron feedstock until it forms a boron melt 64. The Lorentz forces from the Direct Induction coil(s) and/or concentrator (see FIGS. 3 and 4) can be utilized to alter the shape of the boron melt 64 such that the top portion of the melt 62 is typically of smaller diameter than the bottom portion of the melt 63. Multiple frequencies in the Direct Induction currents, spacing of the Direct Induction coils or concentrators (both coil-to-coil spacings and inner diameter spacings) can be manipulated to control both the shape of the boron melt 64 and the vertical heating profile of the boron melt 64. The shape of the boron melt 64 is an important factor for several reasons. For example, the bottom region of the boron melt 63 must stay below the melting point of the mostly boron nitride crust 66 that forms on the bottom side of the boron melt 64. Otherwise, the crust 66 will melt, and the boron melt 64 would then melt the boron nitride crucible 510. Also, the top region of the boron melt 62 must reach the smoking point, such that the B/BN molecules evaporate from the top of the boron melt 64. In addition, some of the nitrogen gas entering the chamber (not shown) dissolves into the boron melt and contributes to the formation of the B/BN molecules as the temperature of the boron melt increases. The rate of nitrogen dissolution is temperature dependent and increases with temperature. Having the ability to adjust the heat profile on the boron melt 64 can be used to vary the temperature distribution across the boron melt 64 and thereby vary the nitrogen dissolution and consequent evolution of B/BN.

The laser beams 67 and electric arc illustrated FIG. 6 can also be utilized to further control the heating and consequent temperature profile on the top region of the boron melt 62 as a way of controlling the local flux distribution of B/BN molecule production. Further, this heating distribution can contribute to the control of the shear forces and heat profile in the self-assembly region 61. Controlling the BNNT self-assembly process is important for the quality of the BNNT material including the alignment of the BNNT fibers.

If molybdenum, tungsten, or other refractory metal are utilized, it should be understood that these metals are not catalysts in the BNNT synthesis process and further do not appear in the BNNTs. Instead, these metals only aid in the process to bring the boron feedstock to a level of electrical conductivity where the feedstock can be heated by Direct Induction from the Direct Induction coils or concentrator.

Figure 7:
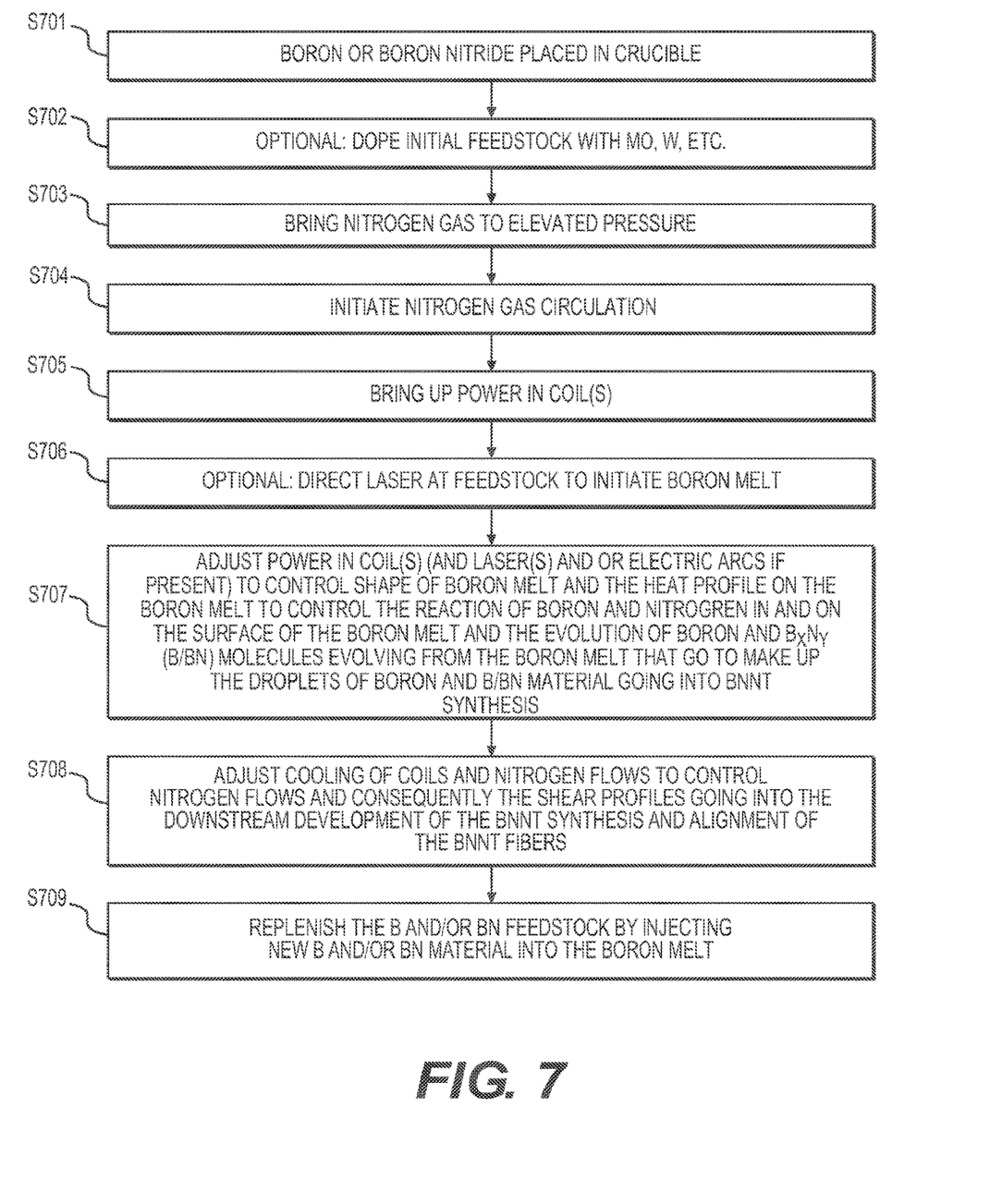
FIG. 7 is a flow chart for synthesizing BNNTs using Direct Induction according to an embodiment of the present approach.

FIG. 7 provides a basic process flowchart for the synthesis of high quality BNNT via Direct Induction. At step S701, the boron feedstock, such as solid boron or boron nitride, is placed in a crucible. In optional step S702, the boron feedstock may be doped with a refractory metal. Simply placing pieces of the refractory metal in the boron feed stock works; additionally, the boron feedstock can already be a mixture for example of boron, boron nitride and the refractory metal. At step S703, nitrogen gas flow is introduced to the chamber. The nitrogen gas flow may be at an elevated pressure, from about 1 atm to about 250 atm, and including, for example, from about 1 atm to about 12 atm. Additionally, noble gases such as helium, neon, argon, krypton and/or xenon may be present especially during start up while the boron melt is being achieved. After the desired operating pressure is achieved, at step S704 the nitrogen flow circulation is initiated. At step S705, power is supplied to the Direct Induction coils. In embodiments including an additional heat source, such as a laser or electric arc, option step 706 involves focusing the laser(s) at the feedstock to form the boron melt and a boron nitride crust. After the boron melt is formed, the additional heat source may be removed, or adjusted as part of step S707 to control the BNNT synthesis. At step S707, the coil power and any additional heat is manipulated to control the shape of the boron melt and heat profile in the chamber. During the step, the reaction of boron and nitrogen in and on the surface of the boron melt results in the evolution of B/BN in a downstream direction of the boron melt, in the direction of the nitrogen flow. BNNTs will self-assembly from the boron droplets and B/BN. At step S708, cooling of coils and nitrogen flow is performed to control the shear profiles in the chamber, and in particular downstream of the boron melt. The shear profiles in the chamber direct the self-assembled BNNTs downstream, and align the BNNTs into BNNT fibers. At step S709, which may be optional in some embodiments, the boron feedstock may be replenished through the addition of feedstock material. For example, rods of boron can be inserted from near the top edge of the crucible 510, boron or boron nitride powder can simply be dropped in from above, or a tube furnace arrangement, not shown, may preheat particles of boron or boron nitride and allow them to fall onto the boron melt 64 from above the boron melt 64.

It should be apparent from the present approach that Direct Induction may be used as a tool to efficiently provide heat to a boron feedstock and/or boron melt, its support, and BNNT self-assembly regions, and thereby drive the chemical reaction processes that are to some extent within the boron melt in terms of creating B/BN molecules, though the chemical processes (i.e., BNNT self-assembly) are downstream of the boron melt and external to the boron melt. It should be appreciated that the present approach calls for more than merely heating boron with Direct Induction, and involves a complex series of chemical reactions leading to BNNT self assembly driven by heat supplied in various stages and at various locations, either all or in part by Direct Induction.

Some embodiments may benefit from controlling the temperature of various components, so as to establish a generally steady-state operation. One of ordinary skill should recognize that the temperature profile during operation may have an impact on the BNNT self-assembly flux and sheer forces on the forming BNNT molecules. Thus, downstream portions of the apparatus may be configured to generate and maintain the desired sheering and velocity profiles to produce the desired BNNT products.

Figure 8:
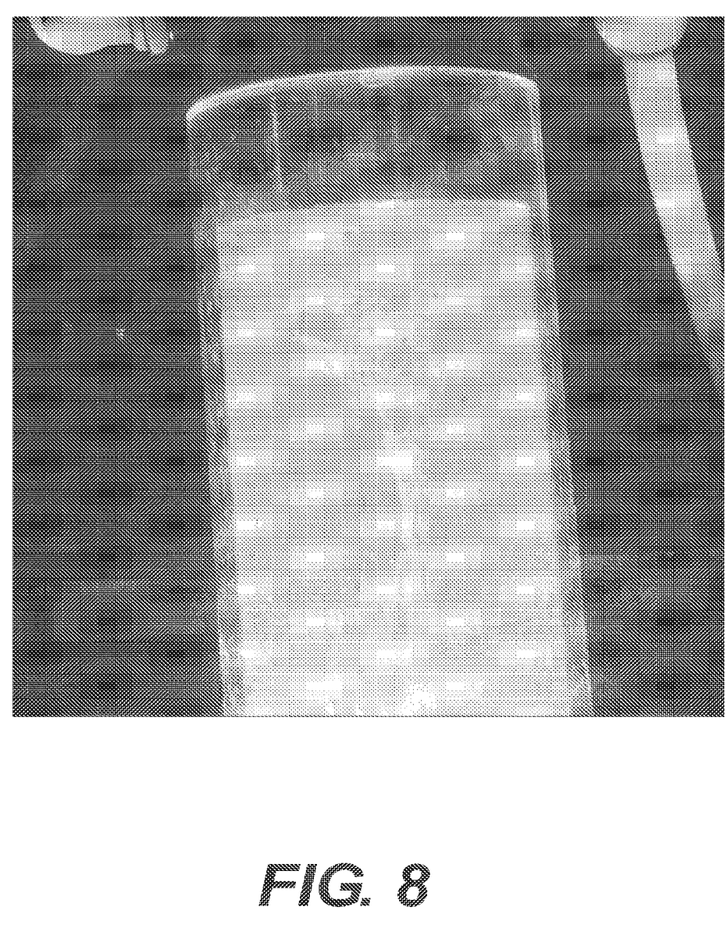
FIG. 8 is a photograph showing BNNTs synthesized using Direct Induction according to an embodiment of the present approach.

FIG. 8 is a photograph showing BNNTs synthesized using Direct Induction according to an embodiment of the present approach, and in particular a "cobweb" of BNNTs recovered above the boron melt 17 in a prototype apparatus similar to the embodiment shown in FIG. 4. The clear tube in the apparatus was approximately 3 cm in diameter and the BNNT "cobweb" was about 10 cm in length. As the demonstration using the prototype apparatus was of relatively short duration with a slow heating of about 10 minutes with BNNT cobweb forming in less than 10 seconds. There was no additional heat or cooling provided to self-assembly region. The demonstration did not require a laser for additional heating, as the Direct Induction coils provided adequate heat, but the boron feedstock included refractory metals to provide electrical conductivity needed for forming the boron melt.

Figure 9:
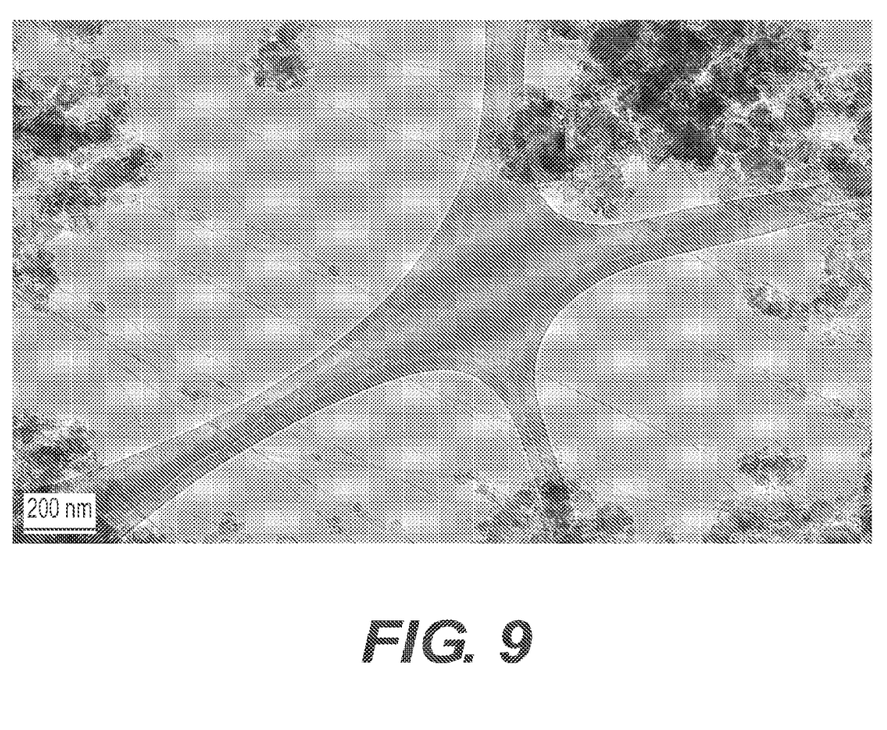
FIG. 9 shows a transmission electron microscopy image of BNNTs synthesized using Direct Induction according to an embodiment of the present approach.

FIG. 9 shows a transmission electron microscope (TEM) image of the BNNTs shown in FIG. 8. The BNNTs long fibers mostly running from the upper left to the lower right of the image, along with a collection of boron and boron nitride particles also formed in the process, against a structure of a lacy carbon grid in the form of an "X" used to support the BNNTs in the TEM. The BNNTs observed are few-wall and have lengths that typically span far beyond the approximately 2.5 microns width of the image. The operating conditions were appropriate for an initial proof of concept, but it should be appreciated that the prototype apparatus used was not configured for minimizing the amounts of the boron and boron nitride particles in the product, or collecting large quantities of BNNT material.

The mechanical structures, water cooling for the coils and surrounding surfaces, the nitrogen pressure chamber, and the systems to harvest the BNNTs, are not shown in the FIGS. 1, 2, 3, 5 and 6. As one of ordinary skill should appreciate, a diverse number of arrangements for the heat sources, cooling, and electromechanical arrangements can be combined to provide the efficient production of BNNTs in various forms. For example, see related applications U.S. Provisional Patent Application No. 62/164,997, U.S. Provisional Patent Application No. 62/194,972, and International Application No. PCT/US2015/58615, all of which are incorporated by reference in their entirety.

Production of high quality BNNTs can be achieved by utilizing Direct Induction technology as the heat source for driving the BNNT self-assembly process. Appropriate structures, materials, geometries, sizes and processes must be utilized. Conditions for achieving sustained production of BNNTs have been demonstrated.

The terminology used herein is for the purpose of describing particular embodiments only and is not intended to be limiting of the approach. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The principles described herein may be embodied in other specific forms without departing from the spirit or essential characteristics thereof. The present embodiments are therefore to be considered in all respects as illustrative and not restrictive.

What is claimed is:

1. A process for synthesizing boron nitride nanotubes (BNNTs), the process comprising:
    feeding gas containing nitrogen to a chamber in a first direction;
    pre-heating a boron feedstock in the chamber to form an electrically conductive boron material;
    supplying power to a Direct Induction coil surrounding the electrically conductive boron material;
    heating the electrically conductive boron material through induction heating from the Direct Induction coil to form a boron melt;
    wherein boron and boron-nitrogen evaporate from the boron melt in the first direction, and BNNTs self-assemble from the evaporated boron and boron-nitrogen downstream from the boron melt in the first direction.

2. The process of claim 1, wherein pre-heating the boron feedstock to form an electrically conductive boron material comprises heating the boron feedstock to a temperature above 800° C. and below the melting temperature of boron nitride.

3. The process of claim 1, wherein forming the boron melt causes a portion of the nitrogen in the gas entering the chamber to dissolve in the boron melt and evaporate boron nitride from the boron melt in the first direction.

4. The process of claim 1, wherein the boron feedstock includes a refractory metal.

5. The process of claim 1, wherein the boron feedstock is supported in a crucible in the chamber.

6. The process of claim 5, wherein the crucible is supported in a Direct Induction eddy current field concentrator.

7. The process of claim 5, wherein the crucible is supported by a Direct Induction coil.

8. The process of claim 5, further comprising cooling the crucible.

9. The process of claim 1, further comprising depositing a layer of boron nitride under the boron feedstock.

10. The process of claim 1, wherein BNNTs self-assemble and align in a growth zone downstream of the boron melt in the first direction.

11. The process of claim 1, wherein pre-heating the boron feedstock to form an electrically conductive boron material comprises heating the boron feedstock with at least one laser.

12. The process of claim 1, wherein pre-heating the boron feedstock to form an electrically conductive boron material comprises heating the boron feedstock with at least one electric arc.

13. The process of claim 1, further comprising feeding at least one noble gas to the chamber.

14. The process of claim 1, wherein BNNTs self-assemble in a growth zone downstream of the boron melt in the first direction, and further comprising supplying power to a second Direct Induction coil surrounding at least a portion of the growth zone.

15. The process of claim 1, wherein BNNTs self-assemble in a growth zone downstream of the boron melt in the first direction, and further comprising supplying power to a direct current coil surrounding at least a portion of the growth zone.

16. The process of claim 1, further comprising controlling the flow rate of the nitrogen gas at the boron melt and in a BNNT self-assembly growth zone downstream of the boron melt.

17. A process for synthesizing boron nitride nanotubes (BNNTs), the process comprising:

feeding gas containing nitrogen to a chamber in a first direction;

pre-heating a boron feedstock in the chamber to a temperature above 800° C. to form an electrically conductive boron material;

supplying power to a Direct Induction coil surrounding the electrically conductive boron material;

heating the electrically conductive boron material through induction heating from the Direct Induction coil to form a boron melt;

wherein BNNTs self-assemble from boron and boron-nitrogen evaporating downstream from the boron melt in the first direction.

18. The process of claim 1, wherein the boron feedstock contains a layer of boron nitride.

19. The process of claim 17, wherein the boron feedstock includes a refractory metal.

20. The process of claim 19, wherein refractory material comprises at least one of molybdenum and tungsten.

* * * * *